United States Patent
Dehondt et al.

(10) Patent No.: US 10,513,054 B2
(45) Date of Patent: Dec. 24, 2019

(54) CONTINUOUS DEVICE FOR IMPREGNATING, IN A SINGLE STEP, STRANDS OR RIBBONS OF NATURAL FIBERS, IN PARTICULAR OF LINEN

(71) Applicant: Dehondt Technologies, Notre Dame-de-Gravenchon (FR)

(72) Inventors: Guy Dehondt, Auberville la Campagne (FR); Edouard Philippe, Le Havre (FR)

(73) Assignee: DEHONDT TECHNOLOGIES (FR)

( * ) Notice: Subject to any disclaimer, the term of this patent is extended or adjusted under 35 U.S.C. 154(b) by 12 days.

(21) Appl. No.: 15/310,284

(22) PCT Filed: May 4, 2015

(86) PCT No.: PCT/FR2015/051179
§ 371 (c)(1),
(2) Date: Nov. 10, 2016

(87) PCT Pub. No.: WO2015/173489
PCT Pub. Date: Nov. 19, 2015

(65) Prior Publication Data
US 2017/0246766 A1    Aug. 31, 2017

(30) Foreign Application Priority Data

May 12, 2014   (FR) .................................... 14 54199

(51) Int. Cl.
*B29B 15/12*  (2006.01)
*B29B 15/08*  (2006.01)
(Continued)

(52) U.S. Cl.
CPC .............. *B29B 15/12* (2013.01); *B29B 13/08* (2013.01); *B29B 15/08* (2013.01); *B29B 13/06* (2013.01);
(Continued)

(58) Field of Classification Search
CPC ......... B29B 15/08; B29B 15/10; B29B 15/12; B29B 15/122; B29B 15/125;
(Continued)

(56) References Cited

U.S. PATENT DOCUMENTS

| 7,387,828 B2 | 6/2008 | Guevel et al. | |
| 2003/0088025 A1* | 5/2003 | Ogawa | C08G 8/28 |
| | | | 525/107 |

(Continued)

FOREIGN PATENT DOCUMENTS

| FR | 2958663 | 10/2011 | |
| WO | 0143934 | 6/2001 | |
| WO | WO-0143934 A1 * | 6/2001 | ............... D02G 3/40 |

OTHER PUBLICATIONS

WO 01/43934 A1, Hertel, Robert, machine translation GER to ENG (Year: 2001).*
International Search Report dated Aug. 31, 2015.

*Primary Examiner* — Joseph S Del Sole
*Assistant Examiner* — Lawrence D. Hohenbrink, Jr.
(74) *Attorney, Agent, or Firm* — Gerald E. Hespos; Michael J. Porco; Matthew T. Hespos (57) ABSTRACT

A continuous device (1) is provided for impregnating, in a single step, strands or ribbons of natural fibers (100) with a specific aqueous polymer dispersion to consolidate the fibers at the core of the fiber bundle and to improve their mechanical strength without any need for twisting. The device includes a stretching component (10) for elongating by the strand or the ribbon of natural fibers by stretching to give them a required yarn count, an impregnating component (20) for impregnating the fibers with the aqueous dispersion, a shaper for shaping/calibrating the wrung fibers, a dryer (40) for drying the shaped/calibrated fibers, and a conditioner (50) for conditioning the dried fibers to transform them into yarn or ribbon.

7 Claims, 3 Drawing Sheets

(51) Int. Cl.
*B29B 13/08* (2006.01)
*B29B 15/10* (2006.01)
*B29B 13/06* (2006.01)
*B29C 70/50* (2006.01)
*B29K 311/10* (2006.01)

(52) U.S. Cl.
CPC ............ *B29B 15/10* (2013.01); *B29B 15/122* (2013.01); *B29B 15/125* (2013.01); *B29B 15/127* (2013.01); *B29C 70/506* (2013.01); *B29K 2311/10* (2013.01); *Y10T 428/2933* (2015.01); *Y10T 428/2971* (2015.01)

(58) Field of Classification Search
CPC ....... B29B 15/127; B29B 13/06; B29B 13/08; B29K 2311/10; Y10T 428/2971; Y10T 428/2933; B29C 70/506
USPC .............................................. 425/66, DIG. 17
See application file for complete search history.

(56) References Cited

U.S. PATENT DOCUMENTS

2004/0109991 A1* 6/2004 Guevel ................... B29C 70/20
 428/298.1
2009/0202829 A1* 8/2009 Fox .......................... B29B 9/14
 428/375

* cited by examiner

CONTINUOUS DEVICE FOR IMPREGNATING, IN A SINGLE STEP, STRANDS OR RIBBONS OF NATURAL FIBERS, IN PARTICULAR OF LINEN

BACKGROUND

1. Field of the Invention

This invention relates to a device for impregnating strands or ribbons of natural fibers, in particular of linen, with a specific aqueous polymer dispersion in order to consolidate the fibers at the core of the fiber bundle and to improve their mechanical strength without any need for twisting. The invention also relates to the treated fibers and to their use in composite materials.

Natural fibers of linen, hemp or sisal and, in particular of linen, are not continuous fibers but discontinuous fibers connected to one another by transverse fibrils ensuring their strength. However, this strength is fairly low, complicating the implementation and the use thereof in finished products. Therefore, it is advantageous and even necessary to reinforce the mechanical strength of the strands or yarns or ribbons of natural fibers, in contrast to the case of glass or carbon fibers which are continuous.

2. Description of the Related Art

Concerning the use of such natural fibers in textiles, it is known to twist them so as to form a yarn having a sufficient mechanical strength.

The challenge is to obtain this improved mechanical strength of the strand of fibers but without any twisting of the fibers. When one wants to make a natural reinforcement in order to fabricate composites, one tries to preserve to a maximum extent the intrinsic qualities of the natural fibers, notably of the linen fibers. Thus, it is recommended not to twist the fibers. In this case, the strands of fibers, that is to say bundles of fibers or ribbons of natural fibers, then consist of fibers for technical use having better mechanical properties than the twisted fibers for textile use, since they have not been damaged by the twisting step.

Consequently, the obtention of a strand or of a ribbon of technical natural fibers that are sufficiently resistant so as not to break during their fabrication requires the production of strands or ribbons of fibers with high yarn count (expressed in tex) that are clearly higher than what is customary with glass or carbon fibers. As a reminder, one tex corresponds to a yarn count or linear weight (per unit of length) equal to 1 g/km or 10-6 kg/m. This required higher yarn count results in unidirectional fibrous reinforcements or nonwovens, or in coarser fabrics, comprising imperfections and thus affecting the final mechanical strength of the composites containing natural fibers such as linen fibers. With this type of reinforcement based on natural fibers, it is moreover not possible to produce light sandwich panels comprising skins made of a composite containing natural fibers, in particular containing linen fibers, of very small thickness.

Thus, the purpose of a ribbon or strand of lower yarn count made of linen fibers is to produce composites containing natural fibers that are nearly continuous and have a greater mechanical strength, and to produce light sandwich panels comprising composite reinforcements based on technical natural fibers, which have better performances than those produced from textile fibers.

Thus, there is a need for consolidating and reinforcing said strands of fibers without using any twisting of the fibers and by looking for a binder that is capable of penetrating to the core of the strands of said fibers to bind the fibers to one another with sufficient cohesion to improve the mechanical strength of the strand.

Thermoplastic composites already have the advantage over composites with a thermosetting matrix of being recyclable and easy to work or shape. The reinforcement with natural fibers adds an additional advantage of the recyclability due to the plant origin of the fibers. This is an important element to consider in the ecological context where one aims to use environmentally friendly, renewable raw materials.

In addition, in comparison to the thermoplastic composites with glass fiber reinforcement, the use of thermoplastic composites with fibrous reinforcement of natural origin, in particular based on linen fibers, makes it possible to reduce the weight of said composites while achieving an equivalent performance. Indeed, the density of the linen fibers (1.5) is approximately forty percent lower than that of the glass fibers. Hence the increasing interest in and need for the ability to fabricate strands or ribbons of natural fibers, in particular of linen, with consolidation between the fibers of the bundle and improved mechanical strength without twisting.

The patent GB 512 558 describes the treatment of cotton fibers by a dispersion of rubber or synthetic resin having a low polymer content ranging from 2 to 10%, without any need to twist the cotton yarns for tensile mechanical strength. After impregnation under pressure, the excess of dispersion is eliminated by a pressurized air jet, with few polymer particles remaining on the fibers after elimination of the excess and drying of the fibers. No data on polymer content remaining between the fibers is specified, and no precise example is cited on the conditions of obtention and on the precise results obtained. This document also does not describe the technical problem of natural fibers such as linen fibers, as stated above, for the purpose of reinforcing thermoplastic matrixes of thermoplastic composite materials.

On the other hand, the patent EP 324 680 describes a device for preparing a reinforced thermoplastic semi-finished product, as a material based on polypropylene reinforced with glass fibers. According to this document, the wetting of the reinforcement fibers is better the more the fibers remain in the unit state and not in the state of strands or base yarns. More particularly, the method described in connection with this device includes the preparation of an aqueous coating composition comprising a resin in the fragmented state and a viscosity regulating agent, and optionally additives, followed by coating of a surface of a mat of reinforcement fibers dispersed in the unit state with the aqueous coating composition, and then drying in order to obtain a semi-finished product in sheet form, optionally followed by melting of said resin. No technical problem connected with the natural fibers such as linen fibers is mentioned in this document, which relates more to that of a semi-finished product based on a polyolefin reinforced with glass fibers.

As to the patent FR 2 223 173, it describes a device for preparing sheets or ribbons of fibers impregnated with resin from an aqueous dispersion of resin, in particular a thermosetting resin, with dispersion after thickening by means of a thickening agent. Again, the fibers concerned are not natural fibers such as linen fibers, and neither the problem presented nor a solution thereof is suggested.

This invention makes it possible to solve the technical problem stated above with respect to the prior art with a specific device for impregnating strands or ribbons of natural fibers wherein this problem arises, this impregnation occurring at the core with a specific aqueous polymer dispersion, thus allowing said polymer to bind at the core of the bundle of fibers, that is to say to one another, the fibers of said strands or of said ribbons in order to consolidate them by the specific impregnation with the fine polymer particles used after melting. This impregnation can lead later and directly to a pre-impregnated fibrous reinforcement, strand or ribbon having a low yarn count that can be used for the fabrication of composite materials.

SUMMARY

Thus, a subject matter of this invention is a continuous device for impregnating, in a single step, strands or ribbons of natural fibers, in particular of linen, with a specific aqueous polymer dispersion in order to consolidate the fibers at the core of the bundle of fibers and to improve their mechanical strength without any need for twisting, comprising the following means:
- means for elongating the strand or the ribbon of natural fibers by stretching in order to give them the required yarn count,
- means for impregnating the fibers with the aqueous dispersion in order to ensure the complete impregnation of the filaments with same,
- means for shaping/calibrating the wrung fibers,
- means for drying the shaped/calibrated fibers, and
- means for conditioning the dried fibers in order to transform same into yarn or ribbon,
- said aqueous polymer dispersion including at least one amorphous polymer with a Tg between approximately 50° C. and 175° C., preferably between approximately 80° C. and 150° C., or a semi-crystalline polymer with a melting temperature between approximately 70° C. and 220° C., preferably between approximately 90° C. and 190° C., more preferably from 100° C. to 170° C., said dispersion including a content by weight of said polymer between approximately 5% and 50% with dispersed particles having a number average size of less than 10,000 nm, preferably between approximately 50 and 5000 nm, and more preferably between approximately 50 and 500 nm.

The polymer dispersion according to the invention is a fine dispersion of polymer particles with limitation of the size of said particles, so that said particles diffuse easily at the core of the bundle of natural fibers to consolidate (bind together) said fibers.

According to preferred embodiments, the device according to this invention includes at least one of the following features:
- the means of elongation by stretching comprise a comb in alternating translation movement and rotary input and output rolls before and after said comb, said rolls creating, by turning in the same direction, a speed differential so that the output speed of the fibers is greater than the input speed of the latter;
- the means of elongation by stretching stretch the fibers with an output ratio between approximately 1 and 25, preferably between approximately 3 and 10;
- the impregnation means consist of a spray system or a system of dipping in a bath of the immersion type or a contact impregnation roll;
- the speed of impregnation in the impregnation means is between a few m/min to several tens of m/min, preferably between approximately 5 m/min and 50 m/min;
- the polymer impregnation content, obtained by means of the impregnation means, is between approximately 0.1% and more than 50 wt % of polymer, preferably between approximately 2% and 5% for a consolidation effect and between approximately 35% and 50% for a pre-impregnated product;
- the shaping means comprise a dry spinning module and a shaping die;
- the shaping means exert a wringing pressure ranging from a few kg to several hundreds of kg, preferably approximately 100 kg;
- the drying means are selected from infrared radiation, microwave flow, heating by induction or by furnace with extraction of water, pulsed-air oven or calendaring on heating rolls;
- the drying temperature is between approximately 100° C. and 250° C., preferably between 100° C. and 200° C.;
- said polymer is selected from: (co)polyamides, (co)polyesters, polyurethanes, poly(meth)acrylates, fluorinated polymers or polyolefins. The polymers of said dispersion according to the invention can be homopolymers or copolymers based on at least two monomers or repeated units, or they can be mixtures of polymers that are compatible with one another. Compatible polymers is understood to mean polymers that are miscible with one another, without phase separation;
- said polymer is selected from a poly(meth)acrylate, including copolymers, functionalized with acid functions, or a fluorinated polymer, including copolymers, grafted with reactive functions, said aqueous dispersion is an aqueous dispersion obtained by emulsion polymerization in the presence of a surfactant, and said reactive functions can react with said natural fibers and, more particularly, with the linen fibers. The term acrylic, in its general meaning according to the invention, unless specifically indicated otherwise, means both acrylic and/or methacrylic. As an example of an acrylic aqueous dispersion one can cite the dispersion based on a copolymer of methyl methacrylate and of butyl acrylate and of acrylic acid. As an example of a fluorinated polymer dispersion, one can cite the aqueous dispersions of PVDF (polyvinylidene fluoride) or copolymers of VDF with other olefins, in particular fluorinated olefins. The surfactant can be a fluorinated surfactant. As example of a fluorinated surfactant, one can cite the perfluorinated octanoic acid ammonium salt. The grafted fluorinated polymer can be obtained by grafting said fluorinated polymer with, for example, maleic anhydride;
- said polymer is a polyurethane formed from a polyisocyanate prepolymer including an ionic group, dispersed in water with chain extension in an aqueous medium. In general, such a prepolymer is obtained by reacting a diol that bears a carboxylic acid function or sulfonic acid function, with a polyisocyanate, in particular diisocyanate, and optionally another diol without ionic function, in an organic medium, in particular with a solvent that is easy to eliminate by evaporation. The dispersion in water is produced after at least partial neutralization of said acid function with a mineral base such as ammonia or an alkali metal hydroxide, or an organic base such as a tertiary amine. The chain extension can be produced with a chain extension agent bearing functions that are reactive with the isocyanate functions of said prepolymer, such as, for example, a diamine. The organic solvent can be eliminated by evaporation in order to recover the final aqueous dispersion of polyurethane, the dry extract content of which can be adjusted by dilution in water;

said polymer is dispersible (or dispersed) in powder form in an aqueous medium without surfactant, and preferably said polymer in the powder state bears ionic groups or groups that are precursors of ionic groups, in particular, by neutralization in water during the preparation of said dispersion;

said polymer is a copolyamide, preferably bearing carboxy, sulfonic terminal groups or amine terminal groups, more preferably having a content of said groups from 50 to 500 µeq/g, in particular 100 to 250 µeq/g;

said copolyamide bears amine groups, preferably primary amines, neutralized in the form of ammonium by an acid, preferably a Bronsted acid, more preferably a phosphorus acid;

said copolyamide bears carboxy groups neutralized in the form of a salt by a base;

said copolyamide is semi-crystalline with a melting temperature less than or equal to 150° C.;

said copolyamide includes at least one of the following monomers: 5.9, 5.10, 5.12, 5.13, 5.14, 5.16, 5.18, 5.36, 6, 6.9, 6.10, 6.12, 6.13, 6.14, 6.16, 6.18, 6.36, 9, 10.6, 10.9, 10.10, 10.12, 10.13, 10.14, 10.16, 10.18, 10.36, 11, 12, 12.6, 12.9, 12.10, 12.12, 12.13, 12.14, 12.16, 12.18, 12.36, 6.6/6, 11/10.10 and their mixtures and preferably includes at least one unit from 11, 12, 10.10, 6, 6.10, 6.12, 10.12, 6.14 and/or 6.6/6, 11/10.10, and their mixtures;

said polymer is a copolyamide selected from: PA 6/6.6/12, PA 6/6.6/11/12, PA 6/12, PA 6.9/12, PA Pip.9/Pip.12/11, PA 6/IPD.6/12, PA IPD.9/12, PA6/MPMD.12/12, PA 6/6.12/12, PA 6/6.10/12, PA 6/Pip.12/12, PA 6/6.6/6.10/6.I, PA 6.10/Pip.10/Pip.12, PA 6/11/12, PA Pip.12/12, PA IPD.10/12, PA Pip.10/12, PA 6/11, PA Pip.10/11/Pip.9, PA 6/6.6/6.10, PA 6/6.10/6.12 and their mixtures;

said copolyamide can be amorphous semi-aromatic and selected from:

6.I, 8.I, 9.I, 10.I, 11.I, 12.I, 6.I/9.I, 9.I/10.I, 9.I/11.I, 9.I/12.I, 9/6.I, 10/6.I, 11/6.I, 12:6.I, 10/9.I, 10/10.I, 10/11.I, 10/12.I, 11/9.I, 11/10.I, 11/11.I, 11/12.I, 12/9.I, 12/10.I, 12/11.I, 12/12.I, 6.10/6.I, 6.12/6.I, 9.10/6.I, 9.12/6.I, 10.10/6.I, 10.12/6.I, 6.10/9.I, 6.12/9.I, 10.I/6.I, 10.10/9.I, 10.12/9.I, 6.10/10.I, 6.12/10.I, 9.10/10.I, 9.12/10.I, 10.10/10.I, 10.12/10.I, 6.10/12.I, 6.12/12.I, 9.10/12.I, 9.12/12.I, 10.10/12.I, 11/6.1/9.I, 11/6.1/10.I, 11/6.1/11.I, 11/6.1/12.I, 11/9.1/10.I, 11/9.1/11.I, 11/9.I/12.I, 11/10.I/11.I, 11/10.I/12.I, 11/11.I/12.I, 6.I/10.I, 6.I/11.I, 6.I/12.I, 10.I/11.I, 10.I/12.I, 11.I/12.I, 12/6.I/10.I, 12/6.I/11.I, 12/6.I/12.I, 12/9.I/10.I, 12/9.I/11.I, 12.9.I/12.I, 12/10.I/11.I, 12/10.I12.1, 12/11.I/12.I, 12/11.I/12.I, the above polyamide terpolymers with 12/replaced by 9/, 10/, 6.10/, 6.12/, 10.6/, 10.10/, 10.12/, 9.10/and 9.12/, all the above-mentioned polyamides, with the isophthalic (I) replaced partially up to 40 mol % by terephthalic (T), 2,6-naphthalenedicarboxylic and/or by 1,3- or the 1,4-CHDA (cyclohexane dicarboxylic acid), with all or part of the linear aliphatic diamines possibly replaced by branched aliphatic diamines, preferably from among trimethyl hexamethylenediamine TMD, methyl pentamethylenediamine MPMD, methyl octamethylenediamine (MOMD) or by cycloaliphatic diamines, preferably from among BMACM, BACM and/or IPD, or arylaliphatic diamines, preferably m- or p-xylylene diamines all the above-mentioned polyamides wherein the isophthalic (I) is replaced partially or completely by a C6 to C18 linear or branched aliphatic diacid and at the same time with complete or partial replacement of the aliphatic diamine by a cycloaliphatic diamine from among BMACM, BACM and/or IPD;

said polymer is semi-crystalline with a melting temperature Tf greater than 90° C., preferably of at least 100° C., and the particles of said dispersion have a number average size between approximately 50 and 5000 nm, and preferably between approximately 50 and 500 nm. This particle size is measured by the laser diffraction method (Coulter LS600) or by scanning electron microscopy. The glass transition temperature Tg of the polymers used is measured with a differential scanning calorimeter (DSC), after a second heating passage, according to the standard ISO 11357-2. The heating and cooling rate is 20° C./min. The melting temperature Tf and the crystallization temperature Tc are measured by DSC, after a first heating, according to the standard ISO 11357-3. The heating and cooling rate is 20° C./min;

the content by dry weight of said polymer with respect to the dry weight of said fibers varies from 0.5% to less than 50%;

said content by weight varies from 0.5 to 10% and said impregnation is limited to the consolidation of said fibers to one another, in addition to a sizing. In the case of the consolidation of the fibers, their cohesion energy increases due to the binding of said fibers to one another at the core of the bundle of fibers. If a sizing is used, the required effect is different and connected with a compatibilization of said fibers with a polymer matrix of the composite by way of the interface created around the fibers with a specific polymer improving the compatibility of the fibers with the matrix for a better adhesion of the fibers to the polymer matrix of the composite material;

said content is greater than 25% and less than 50%, preferably from 30% to 45%, and said impregnation in addition to said consolidation leads to a pre-preg of said fibers which is used or usable separately or successively in the fabrication of composite materials;

the viscosity of said dispersion at 25° C. varies from to 10 to 1000 MPa·s. The method used for the viscosity measurement is the Brookfield method;

said fibers are long fibers, in particular long fibers of linen, with L/D>2000;

said strands or ribbons are based on fibers made of linen having a tex between approximately 10 and 10,000, preferably between approximately 100 and 4000, and more preferably between approximately 500 and 1500;

The invention also relates to impregnated natural fibers; in particular linen fibers, are obtained by means of the device as described above.

Advantageously, the fibers include, as binder for consolidation at the core of the bundle of said fibers, which binds said fibers to one another, the semi-crystalline copolyamide as defined above, and preferably at a content by dry weight of polymer with respect to said fibers+polymer ranging from 0.5 to 10%.

According to an embodiment variant, the fibers constitute reinforcement fibers for composites, in particular for thermoplastic composites, preferably for a polyamide thermoplastic matrix, more preferably for a polyamide matrix based on PA 11, PA10.10 and PA 6.10 and PA 10I/6I.

The invention further relates to composite materials reinforced by natural fibers obtained by means of the device as defined above.

The invention will now be described in greater detail in reference to particular embodiments given only for illustration and represented in the appended figures.

DETAILED DESCRIPTION

Figure 1:
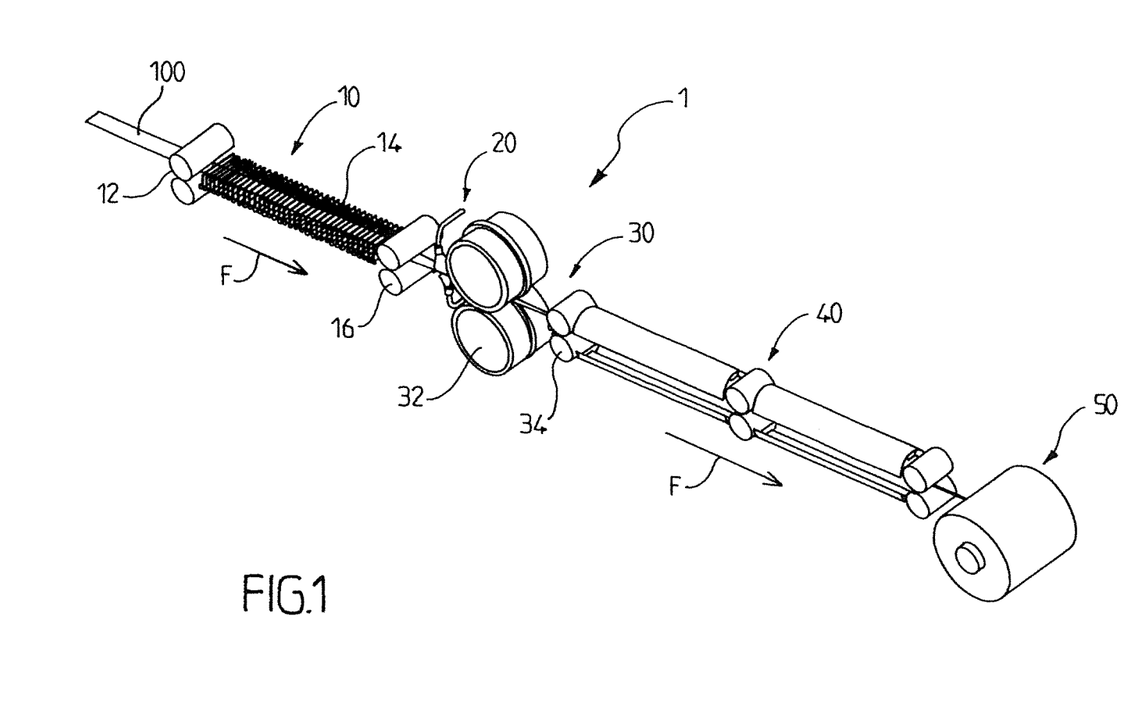
FIG. 1 is a perspective view of a device according to this invention.
Figure 2:
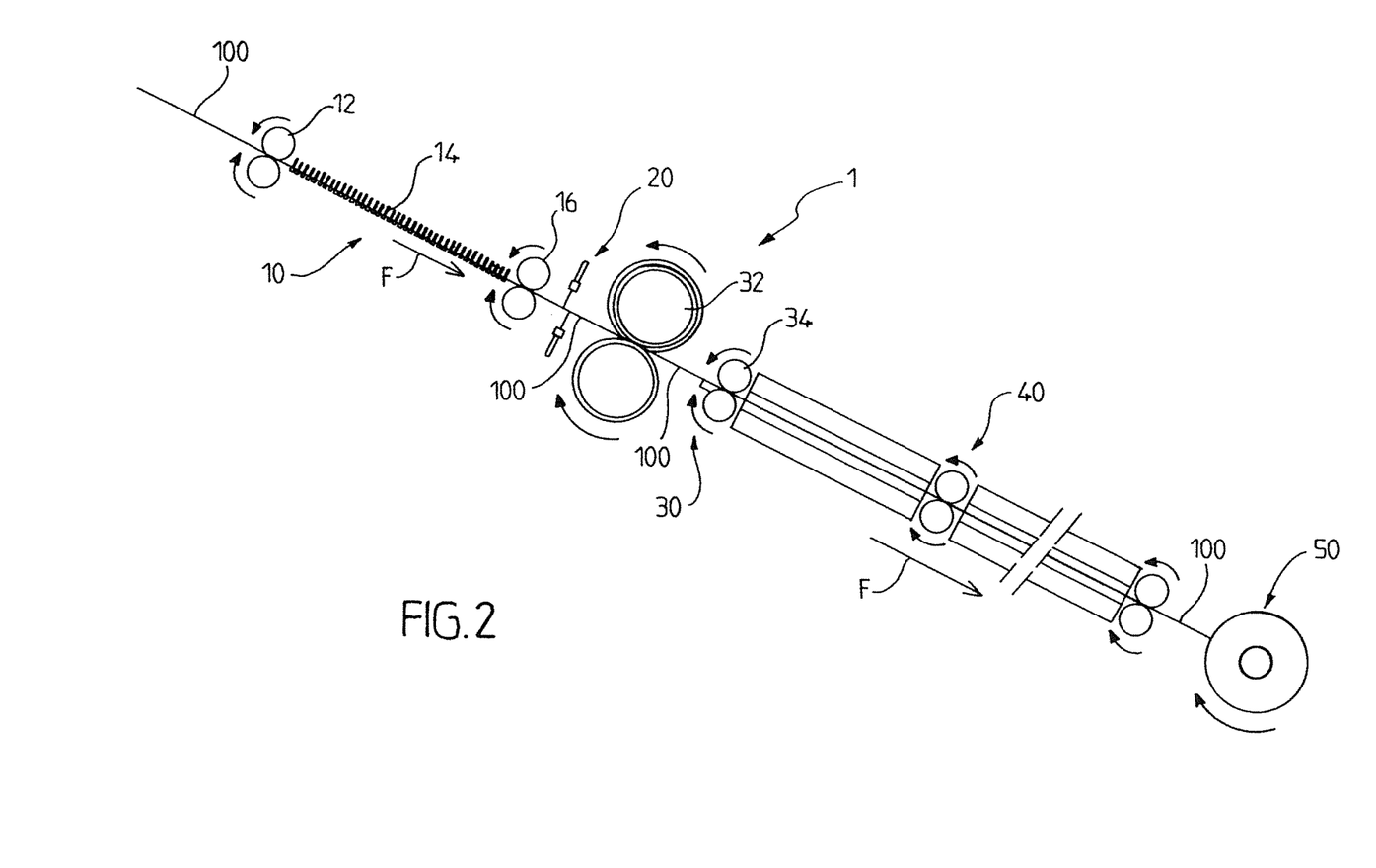
FIG. 2 is a side view of FIG. 1.
Figure 3:
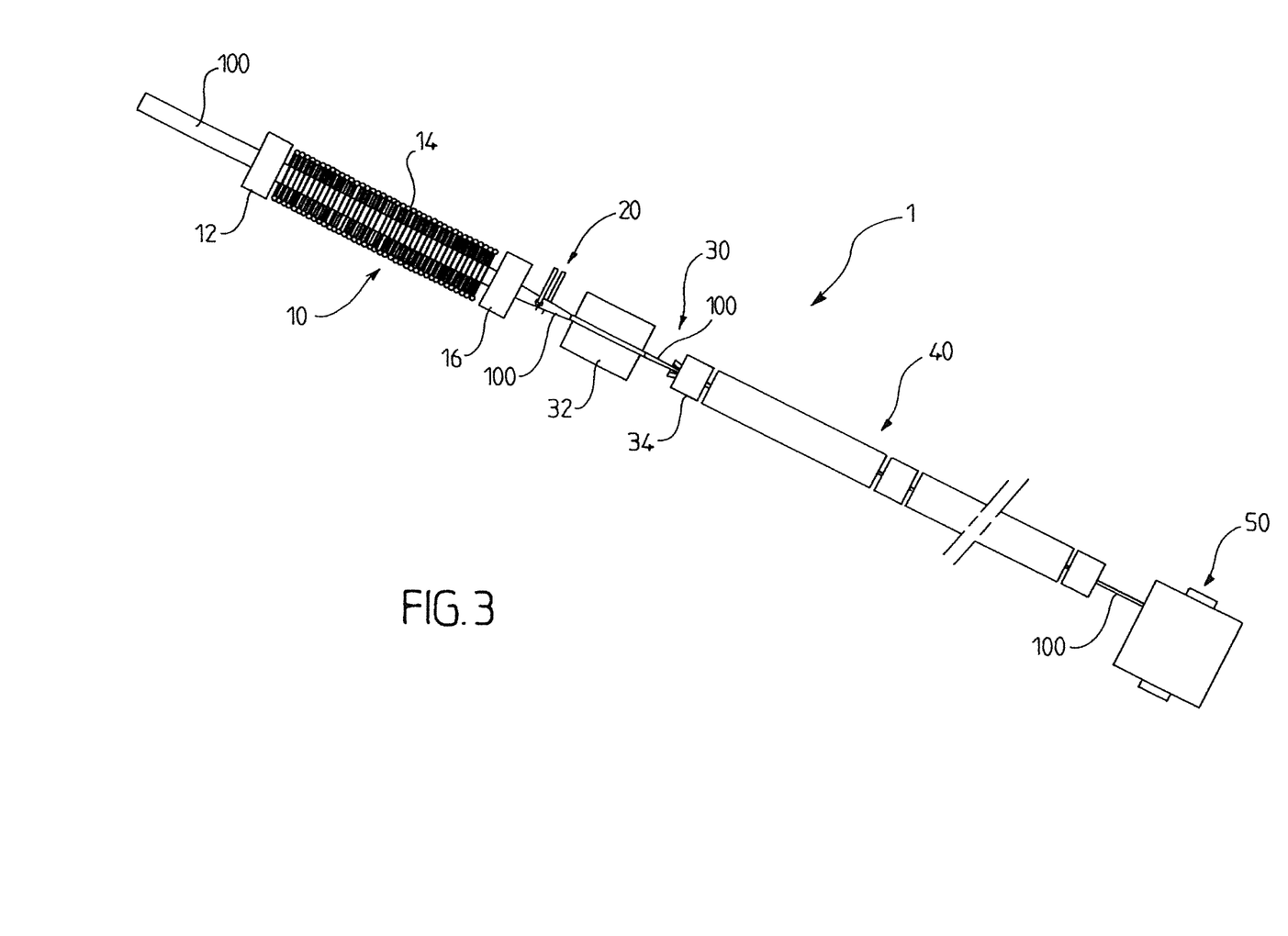
FIG. 3 is a top view of FIG. 1.

FIGS. 1 to 3 represent a device 1 for impregnating natural fibers such as linen by means of a specific polymer, according to this invention.

This device 1 comprises, in the movement direction F of the fibers 100, means for elongating by stretching 10, impregnation means 20, shaping means 30, drying means 40 and conditioning means 50.

The means for elongating by stretching 10 comprise a pair of pinching rotary input rolls 12, a comb 14 with a system with a strip of points and a pair of pinching rotary output rolls 16. The fibers 100, for example, a ribbon of combed linen, which is thus continuous in its macroscopic form, which is 7 g/m, penetrate into the elongation means 10 by means of pinching rotary input rolls 12 and then pass through the comb 14, which performs an alternating translation movement between the two pairs of front pinching rotary rolls before exiting elongated after the pair of pinching rotary output rolls 16. The linen fibers are stretched with an elongation ratio between approximately 1 and 25, preferably between 3 and 10, for example, 7.

The elongation of the fibers 100 is produced simultaneously by the comb and by the speed difference (differential) of rotation of the pairs of pinching rotary rolls, the pinching rotary output rolls 16 turn more rapidly than the pinching rotary input rolls 12.

Thus, after the first segment of the elongation device, the ribbon or strand measures 1 g/m, or an elongation ratio of 7.

The fibers thus stretched then penetrate into the impregnation means 20. At this stage, the ribbon is very fragile, it then passes through an aqueous dispersion mist which is delivered by a spray system. The impregnation speed is between several m/min to several tens of m/min, preferably between approximately 5 m/min and 50 m/min, for example, 30 m/min.

To carry out the impregnation treatment with an aqueous copolyamide solution, 10 L of several solutions (aqueous copolyamide dispersions) were fabricated in a laboratory reactor.

The copolyamides used are commercial products from Arkema called Platamid® 2592 and Platamid® 1657, respectively.

Their essential characteristics are presented in Table I below.

TABLE I

| Type de Platamid ® | Melting temperature | COOH functionality (µeq/g) |
|---|---|---|
| 2592 | 102° C. | 220 |
| 1657 | 107° C. | 180 |

These products were introduced in the form of a dry powder into a solution of water with soda (1% with respect to the Platamid). The final dry extract content (DE) is 30%.

The reagents are loaded into a reactor, then the atmosphere is rendered inert with nitrogen. The reagents are heated for the purpose of reaching the material temperature of 150° C. This heating phase is carried out under stirring at 1000 rpm. Between 100 and 120° C., the mixture becomes homogeneous, white and opaque. The mixture is maintained for 30 min under stirring at 1000 rpm at 150° C., then cooled under stirring at 300 rpm. The dispersions obtained are fluid, white and opaque.

The particle size (size of the particles) was measured by observations carried out by scanning electron microscopy and also by the method of laser diffraction particle size analysis. The two measurement types are in agreement. The data indicated in the table below were obtained by the method of laser diffraction particle size analysis.

The particle size, the viscosity, and the dry extract content of the dispersions used are presented in Table II below.

TABLE II

| Test reference | Platamid of the dispersion | Number average particle diameter (nm) | Brookfield viscosity* at 23° C. (MPa · s) | Dry extract content dispersion (%) |
|---|---|---|---|---|
| EP-063 | Platamid ®2592 | 80 | 30 | 30 |
| EP-064 | Platamid ®1657 | 140 | 20 | 30 |

*The measurement was carried out with a spindle No. 1 at 60 rpm.

These aqueous dispersions thus prepared are then used in the device for treating linen fibers, in undiluted or diluted form.

The polymer impregnation content obtained by means of the impregnation means 20 is between approximately 0.1% by weight and more than 50% by weight of polymer, preferably between approximately 2% and 5% for a consolidation effect, and between approximately 35% and 50% for a pre-impregnated product. In this case, the content obtained is approximately 2.5%.

After spraying, the impregnated fibers pass through the shaping means 30 which comprise, for example, wringing rolls 32 made of rubber, between which the fibers are pressed in order to remove the excess of aqueous polymer dispersion. These two rolls 32 have a first calibration system which forms the intermediate width of the ribbon. The roll means 32 exert a wringing pressure ranging from several kg to several hundreds of kg, preferably of approximately 100 kg, equivalent to 10 MPa of stress on a ribbon 6 mm wide and 1 g/m.

Then, the fibers thus impregnated pass through a calibration or shaping die 34, in order to adjust the ribbon obtained to the very specific size in terms of thickness and of width, preferably ¼ inch or 6.35 mm wide, preferably flat, but also possibly cylindrical.

Between each step, there is a device with a pair of rolls made of treated aluminum which moves the ribbon along so that it is never under tension over too long a distance, more than 1 meter. These drive rolls for the ribbon, motor driven using an electric motor, are controlled by an electromagnetic clutch which adjusts a constant tensile stress of the ribbon.

After the calibration step, the ribbon of impregnated fibers 100 is passed through the drying means 40 which evaporate the water contained in the ribbon and melt the dispersed polymer at the core in order to consolidate the ribbon. These drying means 40 include, for example, seven series-connected 1200 Watt short-wave infrared emitters each 405 mm long. The power of each emitter can be variable, so as to obtain a specific temperature profile for the drying and the melting of the polymer. For example, the first three emitters are adjusted at 250° C., and then the next four at 180° C. The total drying length is approximately three meters, which corresponds to a drying duration of 6 seconds for a movement speed of the ribbon of 30 m/min. The drying temperature of the ribbon is between approximately 100° C. and 250° C., preferably between 100° C. and 200° C., for example, 150° C.

The degradation temperature of the linen fibers is approximately 230° C., but the fiber, after impregnation and as a function of the duration of its passage through the drying means 40, can tolerate temperatures between 250° C. and 300° C. The purpose of the drying is to evaporate the water contained in the dispersion and to melt the polymer at the core of the fiber in order to obtain a satisfactory impregnation quality.

Upon exiting the drying means 40, the ribbon has to be completely dry at the end of the drying and the thermoplastic polymer has to have gone back down below its melting temperature, or, for example, below 110° C.

At the end of the device, the impregnated, shaped and dried ribbon is wound around a winder 52 which packages the product in the form of a spool, for example, with a cardboard spool core having an internal diameter of 75 mm.

The continuous device operates at a constant linear speed. Tension measuring devices (not represented) control the tension of the ribbon by way of the electromagnetic clutch, so that there is no weakening of the fiber before the final packaging on the spool.

This device thus makes it possible in a single step to elongate, and without any twisting step, to impregnate, shape, consolidate and package a very fine ribbon made of linen fibers measuring a few g/m, preferably 1 g/m, on a spool, with a potential length of several thousand meters.

The impregnation by a copolyamide dispersion thus makes it possible to increase the force at rupture of the strand ribbon of linen fibers very significantly, while reducing its thickness/reducing its linear weight.

A 1st series of tests was carried out on a linen roving (strands of fibers) with a high yarn count of 2190 tex, with different treatments.

Except for Example 7, wherein the impregnation method is specified, in all the other cases (unless especially specified for each example), said impregnation was carried out by in-line (continuous) spraying with a spray device (spray), with a residence time under the jet of said sprayer of approximately 1 s. The drying is carried out by heating with an infrared device. The cooling is carried out in the open air.

Comparison base 1: non-impregnated strand of 2190 tex.

Example 1

EP-063 ND: impregnation with an undiluted solution (Dry extract content: 30%) of Platamid®2592.

Example 2

EP-063 D50: impregnation with a dispersion diluted to 50%, of Platamid® 2592 (Dry extract content: 15%)

Example 3

EP-064 ND: impregnation with an undiluted dispersion of Platamid® 1657 (Dry extract content: 30%)

Example 4

EP-064 D50: impregnation with a dispersion diluted to 50% of Platamid® 1657 (Dry extract content: 15%)

The 2nd test series was carried out on a linen roving with low yarn count (1030 tex) having undergone a treatment with the Platamid® 1657 at different impregnation contents.

Comparison base 2: non-impregnated strand of low yarn count (0% of polymer)

Example 5 impregnation with a solution 3 diluted by a factor 4 with Dry Extract content: 7.5%

Example 6 impregnation 2 times consecutively (2 passes) with the dispersion of Example 5

Example 7 impregnation by immersion (dipping) in the aqueous dispersion with a longer residence time (10 s)

For the test of tensile strength, the linen roving is stuck to a cardboard frame. The reference length was selected to be 14 mm, it being known that the average length of a linen fiber is approximately 30 mm. The upper edges and lower edges of the cardboard are clamped between the jaws of the dynamometer (Zwick machine), while the lateral edges are cut. The roving is then subjected to traction at a speed of 1 mm/min.

In order to compare the weakly resin-impregnated (up to 10% of the polymer) rovings, the force at rupture of the different samples tested is measured. The results are presented in Table III below.

TABLE III

| Reference | Comparison Base 1 | Example 1 | Example 2 | Example 3 | Example 4 |
|---|---|---|---|---|---|
| Impregnation type | Non-impregnated | EP63-ND | EP63-D50 | EP64-ND | EP64-D50 |
| Resin content by weight | 0 | 2-10% | 2-10% | 2-10% | 2-10% |
| Number of samples | 5 | 8 | 5 | 5 | 5 |
| Mean force at rupture (N) | 443 | 775 | 723 | 888 | 770 |
| Standard deviation | 33 | 98 | 68 | 23 | 73 |

Table III shows that impregnation with a copolyamide dispersion makes it possible to very significantly increase the force at rupture of the strand of linen fibers.

The two dispersions give similar results, and in the direction of consolidation (Examples 2 and 3 in contrast to the comparison base 1), which demonstrates that the consolidation dispersion proposed works, including for 50% dilutions (which corresponds to a dry extract content of 15%).

Table IV below gives the result of different impregnations with Platamid® 1657 and a strand with a low yarn count (1030 tex). One notes that with a dilution by a factor 4 with final dry extract content of 7.5%, a force at rupture equivalent to the one obtained with the non-impregnated roving with high yarn count (2190 tex) is obtained (comparison of Example 5 with the comparison base 1). Thus, it was demonstrated that the use of a copolyamide dispersion as defined above made it possible to use a strand of linen fiber having a yarn count divided by 2 in comparison to the initial strand (1030 tex versus 2190 tex), while substantially keeping the same mechanical strength (approximately the same force at rupture).

In addition, it is shown that by using several impregnation passes (by spraying) with the same dispersion, one increases the copolyamide content in the final strand (comparison between Examples 5 and 6).

To finish, by means of a test of impregnation by immersion (dipping) with a much longer spray time (10 s), it is shown that it is possible to impregnate the strand with nearly 40% (by weight) of copolyamide (Example 7). This content corresponds to a resin (polymer) content found in conventional pre-impregnated reinforcements, thus making it possible to produce composite parts directly, for example, by heat compression, or by means of a fiber placement technology such as pultrusion, without using an additional impregnation operation of the fibrous reinforcement.

Thus, the possibility, with the device according to the invention, of directly producing a ready-to-use, semi-finished composite product of the pre-impregnated type is demonstrated.

TABLE IV

| Reference | Comparison base 2 | Example 5 | Example 6 | Example 7 |
|---|---|---|---|---|
| Impregnation type | Non-impregnated | Product diluted by a factor of 4 (DE: 7.5%) | Product diluted by a factor of 4 (DE: 7.5%) with 2 passes | Impregnation by immersion for 10 s |
| Polymer content (% by weight/fiber + polymer) | 0 | 2.7 | 5.3 | 39.8 |
| Number of samples | 5 | 5 | 5 | 3 |
| Mean force at rupture (N) | 202 | 449 | 549 | 948 |
| Standard deviation | 15 | 49 | 65 | 49 |

This invention thus makes it possible to solve the above-described technical problems with respect to the prior art with a device for the impregnation of strands or ribbons of natural fibers, this impregnation taking place at core with a specific aqueous polymer dispersion, thus enabling said polymer to bind at the core of the fiber bundle, to one another, the fibers of said strands or of said ribbons in order to consolidate them with the fine polymer particles used after melting.

This impregnation can subsequently result in a pre-impregnated fibrous reinforcement, a strand or a ribbon with low yarn count, which can be used for the fabrication of composite materials.

The flexibility of the solution of this invention makes it possible to integrate the invention in a continuous line for fabricating said fibrous reinforcement based on natural fibers, such as linen fibers, from the treatment of the natural fibers harvested in the fields to the fabrication of a strand or of a pre-impregnated and calibrated ribbon.

Thus, in a single step, a strand or ribbon is obtained, which contains the linen fiber and the resin at a content that can be between 0 and 70% by weight of resin. There is no cutting step needed to calibrate the width of the product, since the shaping device ensures this step.

Naturally, the detailed description of the subject matter of the invention, given only as an illustration, in no way constitutes a limitation, the technical equivalents being also included in the scope of this invention.

Thus, the impregnation means 20 can include a system for dipping in a bath of the immersion type, or a contact impregnation roll.

The drying means 40 can also consist of a flow of microwaves, heating by induction or by furnace with extraction of the water, a pulsed-air oven, or calendaring on heated rolls. These drying means can include systems for channeling radiation in order to concentrate the energy towards the product to be dried.

What is claimed is:

1. A continuous device (1) for impregnating, in a single step, strands or ribbons of natural fibers (100), with a specific aqueous polymer dispersion in order to consolidate the fibers at the core of the fiber bundle and to improve their mechanical strength without any need for twisting, comprising the following means:
    means (10) for elongating the strand or the ribbon of natural fibers by stretching in order to give the strand or the ribbon of natural fibers a desired yarn count, the means for elongating including rotary input rolls and rotary output rolls spaced from each other in a movement direction of the natural fibers through the continuous device, and a comb disposed at a specified position between the rotary input rolls and rotary output rolls in the movement direction, the comb performing an alternating translation movement in a direction normal to the movement direction, the rotary input rolls and rotary output rolls rotating at different speeds from each other to define a speed differential, the speed differential between the rotary input rolls and the rotary output rolls and the alternating translation movement of the comb elongating the strand or the ribbon of natural fibers,
    means (20) for impregnating the fibers with the aqueous polymer dispersion to completely impregnate the fibers with the aqueous polymer dispersion, the aqueous polymer dispersion including at least one amorphous polymer with a glass transition temperature between approximately 50° C. and 175° C., or a semi-crystalline polymer with a melting temperature between approximately 70° C. and 220° C., said dispersion including a content by weight of said polymer between approximately 5% and 50% with dispersed particles having a number average size of less than 10,000 nm,
    means (30) for shaping/calibrating the fibers, the means for shaping/calibrating the fibers including a pair of wringing rolls through which the fibers are wrung to remove excess aqueous polymer dispersion and a shaping die for shaping the strands or ribbons,
    means (40) for drying the shaped/calibrated fibers, and
    means (50) for conditioning the dried fibers to transform the dried fibers into yarn or ribbon.

2. The device of claim 1, wherein the means for elongating (10) stretches the fibers (100) with an output ratio between approximately 1 and 25.

3. The device of claim 1, wherein the means for impregnating (20) comprises a spray system or a system of dipping in a bath of the immersion type or of a contact impregnation roll.

4. The device of claim 3, wherein the impregnation speed in the impregnation means (20) is between approximately 5 m/min and 50 m/min.

5. The device of claim 3, wherein a degree of impregnation with polymer obtained with the means for impregnating (20) is between approximately 0.1% and more than 50% by weight of polymer for a consolidation effect, and between approximately 35% and 50% for a pre-impregnated product.

6. The device of claim 1, wherein the means (40) for drying are selected from infrared radiation, microwave flow, heating by induction or by furnace with extraction of the water, a pulsed-air oven or calendaring on heating rolls.

7. The device of claim 6, wherein a drying temperature is between approximately 100° C. and 250° C.

* * * * *